Jan. 28, 1941. G. SLAYTER 2,229,679
APPARATUS FOR MAKING CHEMICAL SUBSTITUTIONS
Original Filed April 28, 1938
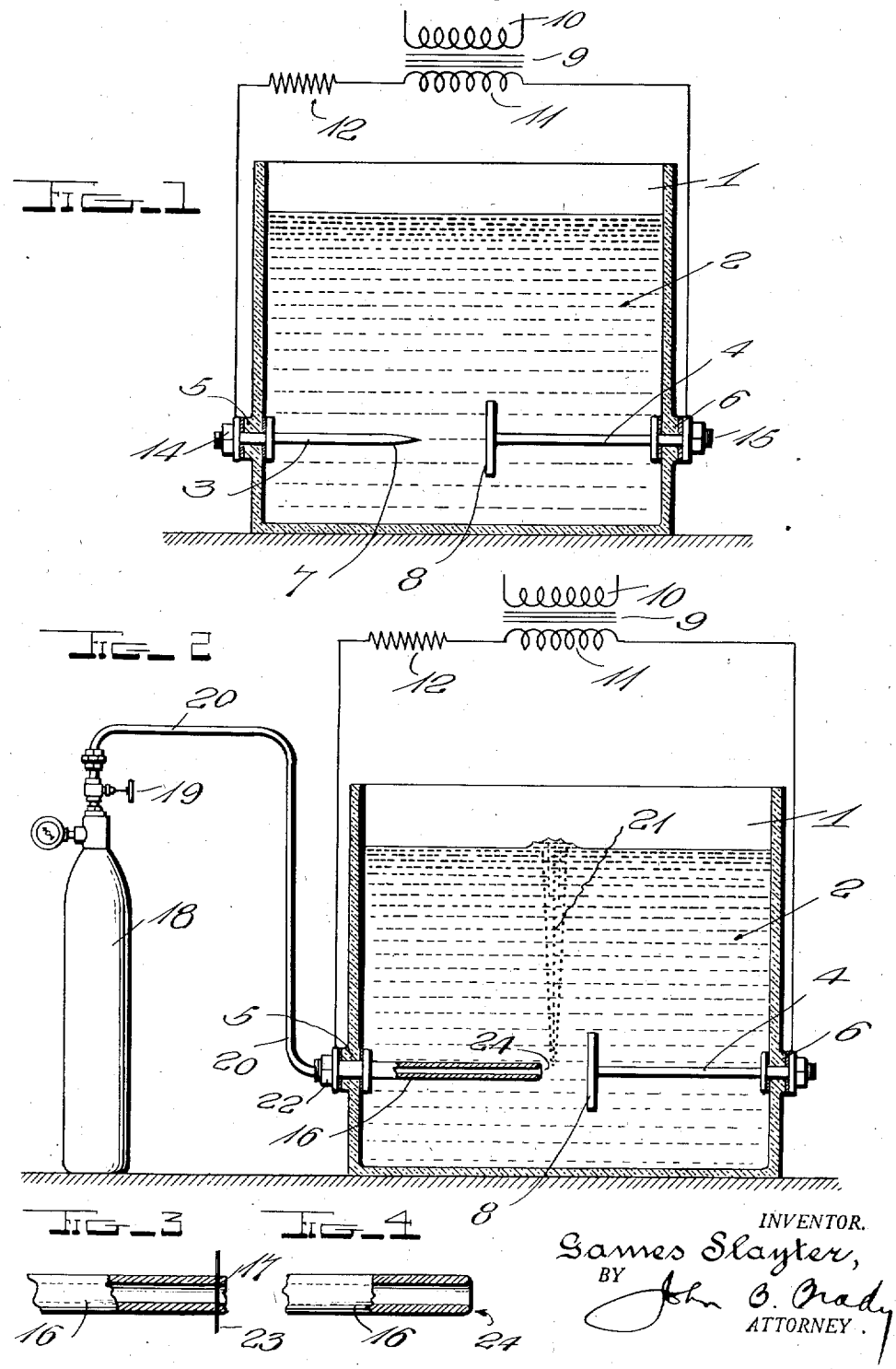

Patented Jan. 28, 1941

2,229,679

UNITED STATES PATENT OFFICE 2,229,679

APPARATUS FOR MAKING CHEMICAL SUBSTITUTIONS

Games Slayter, Newark, Ohio, assignor to Electronic Research Corporation, Newark, Ohio, a corporation of Ohio Original application April 28, 1938, Serial No. 204,885. Divided and this application October 25, 1938, Serial No. 236,960

7 Claims. (Cl. 204—31)

My invention relates broadly to an apparatus for accelerating chemical substitutions by the discharge of electricity from conducting points at high voltage in chemicals.

This application is a division of my application Serial No. 204,885, filed April 28, 1938, for Method of making chemical substitutions.

One of the objects of my invention is to provide an apparatus for electrically accelerating substitutions in chemicals of all combinations and permutations generally such as for example, in hydrocarbons the substitution of chlorine, bromine, amino, and other groups.

Another object of my invention is to provide an apparatus for carrying out a method of promoting catalytic reaction by the discharge of electricity from conducting points at high voltage in chemicals.

Still another object of my invention is to provide an apparatus for electrically accelerating substitutions in chemical baths by means of electrical discharges in which incipient sparks are arrested.

A further object of my invention is to provide an apparatus for promoting substitutions in chemical solutions in which a gaseous substituent is introduced into the chemical under conditions of electrical stress but in which sparking is suppressed.

A still further object of my invention is to provide an apparatus for accelerating chemical changes by electric discharges in chemical solutions while suppressing a condition of sparking.

Other and further objects of my invention reside in the apparatus for promoting substitutions in chemical solutions as set forth more fully in the specification hereinafter following by reference to the accompanying drawing in which:

Figure 1 schematically illustrates one form of apparatus for promoting substitutions in chemical solutions in accordance with my invention when the substituent is capable of being dissolved, mixed or suspended in the solution; Fig. 2 is a schematic view showing the apparatus used in carrying out my invention when the substituent used is in the gaseous form; Fig. 3 is an enlarged fragmentary sectional view showing one manner of forming the hollow tubular electrode employed in the arrangement of Fig. 2; and Fig. 4 is a fragmentary sectional view showing the manner of finishing the end of the tubular electrode.

The discharge of electricity from conducting points at high voltage in chemical solutions can be made to produce regions of high electric stress and molecular dissociation by electron bombardment. Discharge under a nonconducting liquid ordinarily is disruptive in character and is a spark through the liquid accompanied by much heat. If a high resistance is put in series with the discharge point, an incipient spark is arrested so that the principal effect is to produce electron bombardment in vapor phase through short distances near the point.

My invention is directed to an electrical apparatus for promoting substitutions in chemical solutions by producing chemical reactions, including all combinations and permutations of the classes:

$$XY + HY \longrightarrow XY + H_2$$
$$XX + HY \longrightarrow XY + HX$$
$$XY + HZ \longrightarrow XZ + HY$$
$$XY + WZ \longrightarrow XZ + WY$$

where X, Y, Z, and W may each or in any combinations be atoms or radicals of all types and classes.

When effecting substitutions in hydrocarbons of chlorine, bromine, amino, and other groups, either of two methods may be used in treating hydrocarbons of the types:

$$RH + HX \longrightarrow RX + H_2$$

or $$RH + XX \longrightarrow RX + HX$$

where R is the hydrocarbon radical so RH is the hydrocarbon; X is a substituent such as Cl, Br, I, F, $NO_2$, $SO_2$, SH, OH, etc.

The first method is used if the substituent can be dissolved, mixed or suspended, as a colloid, in the hydrocarbon. In this case the reaction is promoted as a result of the discharge from the point. The second method is adapted for use if the substituent must be used in the gaseous form. In this case, the discharge may be drawn from a fine hollow tube such as a hypodermic needle the end of which has been ground square, then polished smooth and rounded. The gaseous substituent is then forced through the tube slowly enough for the gas to break into a train of fine bubbles in the hydrocarbon and thus avoid sparking through the gas alone.

This process is valuable for the accomplishment of substitutions now requiring expensive catalysts, catalysts sensitive to poisons, or catalytic reactions giving poor yields. Methods for producing continuous operation can easily be devised for each reaction because a constriction in the flow of the liquid, just back of the discharging point does not affect the electrical performance of the discharge.

Referring to the drawing in detail, reference character 1 designates a tank in which the chemical solution 2 is contained. The tank 1 is suitably formed to permit the passage of electrodes indicated at 3 and 4, submerged beneath the surface of the chemical solution 2. The electrodes 3 and 4 are so mounted in the tank 1 that a fluid tight connection is made between the electrodes and the side walls of the tank at 5 and 6 by suitable liquid tight cement or gaskets. The electrode 3 is tapered to a discharge point indicated at 7. The electrode 4 is provided with a flat target area 8. A power supply circuit is connected with electrodes 3 and 4 through transformer system 9 and a primary winding 10 and secondary winding 11. Primary winding 10 may be connected with any suitable power source of alternating current. Secondary winding 11 has high resistance 12 connected in series therewith and in series with the binding posts 14 and 15 on electrodes 3 and 4 respectively. The high voltage applied across electrodes 7 and 8 within the chemical solution 2 produces a region of high electric stress and molecular dissociation by electron bombardment. However, there is no disruptive discharge between electrodes 7 and 8 and any incipient spark is arrested by reason of the characteristics of the circuit containing the discharge electrodes resulting from the introduction of high resistance 12. In this arrangement the substituent is dissolved, mixed or suspended as a colloid in the chemical solution 2 and the substitution is effected in the region of high electric stress and molecular dissociation by electron bombardment in the immediate area of discharge point 7 and electrode 8.

Where, however, the substituent must be used in a gaseous form, I provide an arrangement as illustrated in Fig. 2 wherein the electrode 16 is employed in the form of a fine hollow tube, such as a hypodermic needle whose end 17 has been transversely cut as represented in Fig. 3 along the line 23. The cut end 17 of the tube 16 is then rounded as indicated at 24 in Fig. 4, and polished smooth, forming the tubular discharge electrode. The gaseous substituent is contained in pressure tank 18 or its equivalent from which it is supplied to control valve 19 and pipe line 20 to the fine hollow tube electrode 16. The gaseous substituent is forced through tube 16 slowly enough for the gas to break into a train of fine bubbles in the chemical solution 2 and thus avoid sparking through the gas alone. That is to say, the train of fine bubbles indicated at 21 does not permit an accumulation of gases in the region about the smooth rounded end 24 of electrode 16, so that a break-down of the discharge resulting in sparking does not occur. A region of high electric stress and molecular dissociation exists between electrodes 16 and 8 but there is no spark discharge.

The tubular electrode 16 has a binding post 22 thereon which also serves as a coupling member to the supply pipe 20 for delivery of gas through the tube 16. An energization circuit including secondary winding 11 and high resistance 12 connects to electrodes 8 and 16 in the same manner as described in connection with Fig. 1.

The process of substitution carried out by the apparatus of my invention does not involve expensive catalysts, or catalysts sensitive to poisons, or catalytic reactions giving poor yields. The discharge of the gas is controlled by valve 19 so that the flow is so restricted through tubular discharge member 16 that sparking between electrodes 16 and 8 is not permitted. The rate or velocity of flow of the gaseous substituent in the direction of the target electrode 8 is varied and controlled by valve 19.

The region of high electric stress and molecular dissociation hereinbefore described is such as accompanies a non-disruptive discharge such as a dark discharge or a brush or a glow discharge, all of which are forms of "silent" electric discharge as differentiated from disruptive spark and arc discharges which produce sudden noises due to the disruptive effects of the discharges. In the practice of my invention, therefore, I may employ any form of non-disruptive discharge, and wherever in the claims I specify "silent" discharge it will be understood that any discharge non-disruptive in character may be employed, provisions being expressly made for preventing disruptive discharges.

In referring to the making of substitutions in hydrocarbons of chlorine, bromine, amino and other groups it will be understood that this is but one illustration of the application of my invention and that my invention is directed broadly to an apparatus for making substitutions in all chemical solutions including all combinations and permutations of such solutions generally.

It will be entirely clear that I may employ more than one discharge point and more than one discharge tube in the arrangement of my invention.

While I have described the apparatus of my invention in certain preferred forms, I desire that it be understood that my invention may be carried out by modified forms of the apparatus of my invention without departing from the spirit of the appended claims.

What I claim as new and desire to secure by Letters Patent of the United States is as follows:

1. In an apparatus for making chemical substitutions a container for a liquid mixture of a chemical solution and the substituent, means for producing a silent electric discharge including a pair of electrodes in said container submerged in the mixture therein, one of said electrodes comprising a sharp edged discharge electrode directed toward and spacially related to the other electrode in minimum capacitive relation thereto, means for impressing a high voltage between said discharge electrode and said other electrode, and means cooperative with the last said means and having a resistance sufficient in relation to the capacitance of said discharge electrode to prevent disruptive discharge between said discharge electrode and said other electrode; said apparatus being operative to produce a region of high electric stress and molecular dissociation in the liquid mixture between said electrodes wherein the chemical substitution is accelerated.

2. In an apparatus for making chemical substitutions a container for a liquid mixture of a chemical solution and the substituent, means for producing a silent electric discharge including a pair of electrodes extending substantially horizontally through the walls of said container, means for supporting said electrodes in the walls of said container and for preventing seepage of the mixture through the walls of said container at the point of entry of said electrodes, one of said electrodes comprising a sharp edged discharge electrode directed toward and spacially related to the other electrode in minimum capacitive relation thereto, means for impressing a high voltage between said electrodes for establishing a silent electric discharge therebetween and through said mixture, and means cooperative with the last said means and having a resistance sufficient in relation to the capacitance of said discharge electrode to prevent disruptive discharge between said electrodes.

3. In an apparatus for making chemical substitutions a container for a liquid mixture of a chemical solution and the substituent, means for producing a silent electric discharge including a pair of electrodes in said container submerged in the mixture therein, one of said electrodes comprising a sharp edged discharge electrode and the other of said electrodes comprising a plate extending on a plane substantially normal to the plane of the first mentioned electrode, said discharge electrode thereby having a minimum electrical capacitance with respect to said plate, means for impressing a high difference of potential across said electrodes, and means cooperative with the last said means and having a resistance sufficient in relation to the capacitance of said discharge electrode to prevent disruptive discharge between said electrodes; said apparatus being operative to produce a region of high electric stress and molecular dissociation in the liquid mixture between said electrodes wherein the chemical substitution is accelerated.

4. In an apparatus for making chemical substitutions a container for a liquid mixture of a chemical solution and the substituent, means for producing a silent electric discharge including a pair of electrodes in said container submerged in the mixture therein, one of said electrodes comprising a discharge point and the other of said electrodes comprising a plate spacially related to the discharge point, said discharge point having a minimum electrical capacitance with respect to said plate, a circuit for impressing a high difference of potential across said electrodes, and a resistor interposed in said circuit for controlling said circuit and having a resistance cooperative with the capacitance of said discharge point so that disruptive discharge between said electrodes is prevented; said apparatus being operative to produce a region of high electric stress and molecular dissociation in the liquid mixture between said electrodes wherein the chemical substitution is accelerated.

5. In an apparatus for making chemical substitutions a container for a liquid mixture of a chemical solution and the substituent, means for producing a silent electric discharge including a pair of electrodes in said container submerged in the mixture therein, one of said electrodes comprising a discharge point and the other of said electrodes comprising a target plate spacially related to and operatively aligned with the discharge point, said discharge point having a minimum electrical capacitance with respect to said plate, a source of alternating current, a high voltage transformer having its primary winding connected with said source and its secondary winding connected with said electrodes for impressing high potential across said electrodes for establishing a silent electric discharge therebetween and through said mixture, and means in circuit with said secondary winding and said electrodes and having a resistance sufficient in relation to the capacitance of said discharge point to prevent disruptive discharge between said electrodes.

6. In an apparatus for making chemical substitutions a container for a liquid chemical solution, means for producing a silent electric discharge including a pair of electrodes in said container submerged in the solution therein, one of said electrodes comprising a plate and the other of said electrodes comprising a sharp edged tubular member directed substantially horizontally toward and spacially related to said plate in minimum capacitive relation thereto, a source of alternating current, a transformer having a primary winding connected to said source and a secondary winding connected across said electrodes for impressing high voltage therebetween, means connected in circuit with said secondary winding and said electrodes and having a resistance sufficient in relation to the capacitance of said tubular member to prevent disruptive discharge therebetween, and means for introducing a gaseous substituent through said tubular member to a limited extent toward said plate; said apparatus being operative to produce a silent electric discharge from said tubular electrode into the field of which the gaseous substituent is directly introduced.

7. In an apparatus for making chemical substitutions a container for a liquid chemical solution, means for producing a silent electric discharge including a pair of electrodes in said container submerged in the solution therein, one of said electrodes comprising a plate and the other of said electrodes comprising a sharp edged tubular member directed substantially horizontally toward and spacially related to the plate electrode in minimum capacitive relation thereto, a source of alternating current, a transformer having a primary winding connected with said source and a secondary winding connected in circuit with said electrodes for impressing a high voltage across said electrodes, a resistor interposed in series in said circuit and having a resistance sufficient in relation to the capacitance of said tubular member to prevent disruptive discharge between said electrodes, and means for introducing a chemical substituent through said tubular electrode; said apparatus being operative to produce a region of high electric stress and molecular dissociation in the liquid between said electrodes into which the substituent is directly introduced and wherein the chemical substitution is accelerated.

GAMES SLAYTER.